US012611737B2

(12) United States Patent
Sekine

(10) Patent No.: US 12,611,737 B2
(45) Date of Patent: Apr. 28, 2026

(54) METAL PARTICLE FOR JOINT MATERIAL

(71) Applicant: NAPRA CO., LTD., Tokyo (JP)

(72) Inventor: Shigenobu Sekine, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 18/214,753

(22) Filed: Jun. 27, 2023

(65) Prior Publication Data

US 2024/0109156 A1 Apr. 4, 2024

(30) Foreign Application Priority Data

Oct. 3, 2022 (JP) ................................. 2022-159706

(51) Int. Cl.
| | |
|---|---|
| *B23K 35/26* | (2006.01) |
| *B22F 1/05* | (2022.01) |
| *B22F 3/02* | (2006.01) |
| *B22F 5/00* | (2006.01) |
| *B22F 9/10* | (2006.01) |

(Continued)

(52) U.S. Cl.
CPC .............. *B23K 35/262* (2013.01); *B22F 1/05* (2022.01); *B22F 3/02* (2013.01); *B22F 5/006* (2013.01); *B22F 9/10* (2013.01); *B23K 35/02* (2013.01); *C22C 13/00* (2013.01); *B22F 2201/02* (2013.01); *B22F 2301/30* (2013.01); *B22F 2304/10* (2013.01); *B23K 2101/36* (2018.08); *B23K 2103/18* (2018.08)

(58) Field of Classification Search
CPC .............................. B23K 35/262; C22C 13/00
See application file for complete search history.

(56) References Cited

U.S. PATENT DOCUMENTS

| | | | |
|---|---|---|---|
| 10,507,551 B2 | 12/2019 | Sekine | |
| 10,906,136 B1 * | 2/2021 | Sekine | ................. B23K 35/262 |

(Continued)

FOREIGN PATENT DOCUMENTS

| | | | |
|---|---|---|---|
| JP | 2003001482 A | * | 1/2003 |
| JP | 2007-268569 A | | 10/2007 |

(Continued)

OTHER PUBLICATIONS

Chemicool; "Antimony Element Facts", retrieved from internet on Jan. 8, 2025; https://www.chemicool.com/elements/antimony.html (Year: 2025).*

(Continued)

*Primary Examiner* — Sally A Merkling
*Assistant Examiner* — Austin Pollock
(74) *Attorney, Agent, or Firm* — Carrier, Shende & Associates P.C.; Fulchand P. Shende; Joseph P. Carrier

(57) ABSTRACT

Disclosed is a metal particle that includes a basal phase that contains Sn, an Sn—Cu alloy and Sb; and an intermetallic compound crystal that contains Sn, Cu, Ni, Ge, Si and Ti, included in the basal phase, the metal particle has a chemical composition given by 0.7 to 15% by mass of Cu, 0.1 to 5% by mass of Ni, 0.1 to 14% by mass of Sb, 0.001 to 0.1% by mass of Ge, 0.001 to 0.1% by mass of Si, 0.001 to 0.1% by mass of Ti, and the balance of Sn; the basal phase has a chemical composition given by 85 to 99.9% by mass of Sn, 5% by mass or less of Cu, and 0.1 to 14% by mass of Sb; and, at least parts of the basal phase and the intermetallic compound crystal form an endotaxial joint.

2 Claims, 8 Drawing Sheets

(51) Int. Cl.
    *B23K 35/02*     (2006.01)
    *B23K 101/36*    (2006.01)
    *B23K 103/18*    (2006.01)
    *C22C 13/00*     (2006.01)

(56)         References Cited

U.S. PATENT DOCUMENTS

| | | | | |
|---|---|---|---|---|
| 11,364,575 | B2 | 6/2022 | Sekine | |
| 11,607,753 | B2 * | 3/2023 | Yoshikawa | B23K 35/40 |
| 2020/0376606 | A1 * | 12/2020 | Yokoyama | C22C 13/02 |
| 2021/0078112 | A1 * | 3/2021 | Sekine | B23K 35/262 |
| 2021/0283725 | A1 * | 9/2021 | Sekine | B22F 9/082 |
| 2023/0166363 | A1 * | 6/2023 | Naruse | C22C 13/02 |
| | | | | 257/772 |

FOREIGN PATENT DOCUMENTS

| | | | |
|---|---|---|---|
| JP | 6029222 | B1 | 11/2016 |
| JP | 2018144080 | A * | 9/2018 |
| JP | 2019025540 | A * | 2/2019 |
| JP | 6744972 | B1 | 8/2020 |
| JP | 6799649 | B1 | 12/2020 |
| JP | 6799701 | B1 | 12/2020 |
| JP | 6836006 | B1 * | 2/2021 |
| JP | 2021-031741 | A | 3/2021 |
| JP | 2021-058900 | A | 4/2021 |
| JP | 6898509 | B1 | 7/2021 |
| JP | 2021-142542 | A | 9/2021 |
| JP | 2022-074400 | A | 5/2022 |
| WO | WO-2023248302 | A1 * | 12/2023 |

OTHER PUBLICATIONS

Office Action issued on Oct. 11, 2023 in the corresponding Taiwanese Patent Application No. 112103796.

* cited by examiner

EDS Count Data
200kV JEM-2100F/HK

EDS analysis also detected signal counts attributable to elements other than
Sn and Cu.  Sb resides in Sn phase.
Ni resides in Cu phase.

Fig. 3B

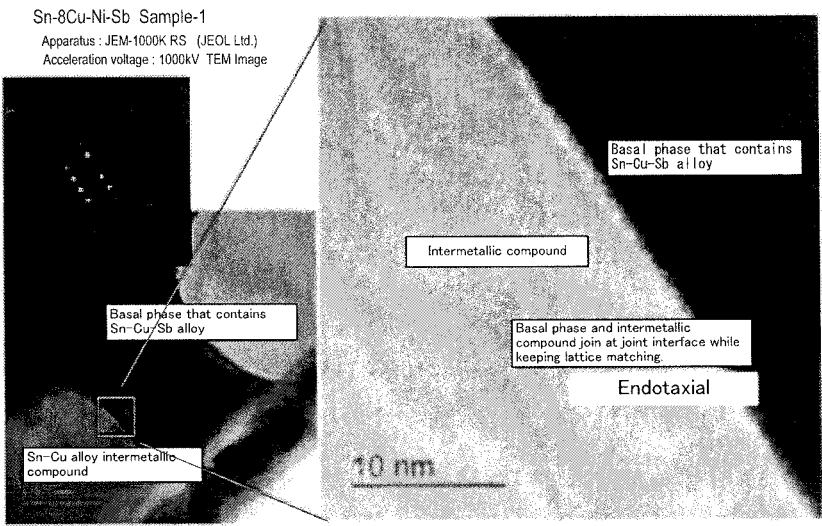

Sn-8Cu-Ni-Sb Sample-1
Apparatus : JEM-1000K RS  (JEOL Ltd.)
Acceleration voltage : 1000kV  TEM Image Basal phase that contains
Sn-Cu-Sb alloy Intermetallic compound Basal phase and intermetallic
compound join at joint interface while
keeping lattice matching.

Endotaxial

Basal phase that contains
Sn-Cu-Sb alloy

Sn-Cu alloy intermetallic
compound 10 nm

Fig. 4A

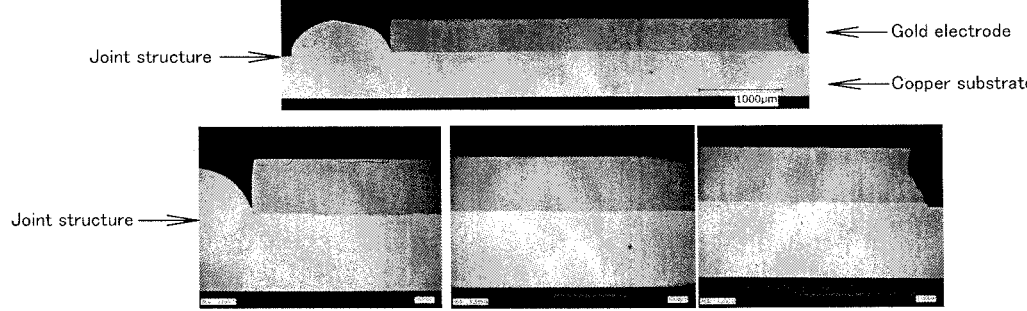

Gold electrode

Joint structure

Copper substrate

1000μm

Joint structure

IMC

Cu substrate

Basal phase

HV-HR-TEM image

HV-HR-TEM image (enlarged)

Joint structure → ← Silicon substrate
← Copper substrate

Joint structure →

← Silicon substrate
← Copper substrate

METAL PARTICLE FOR JOINT MATERIAL

INCORPORATION BY REFERENCE

This application is based on Japanese Patent Application No. 2022-159706, filed on Oct. 3, 2022, the content of which is incorporated hereinto by reference.

BACKGROUND OF THE INVENTION

1. Field of the Invention

This invention relates to a metal particle for joint material.

2. Description of the Related Art

In an advancing situation of Internet of Things (IoT) with ever-growing needs for energy saving, power semiconductor that holds the key for the technology has been increasingly gaining its importance, while leaving many problems on effective use thereof to be solved. The power semiconductor, which handles high power ascribed to high voltage and large current, and is used for ultra-high speed transmission, produces large amount of heat and becomes hot. Even Si power semiconductor, although having been suited to a required level of heat resistance up to approximately 175° C., is on the way to development in pursuit of yet higher heat resistance up to around 200° C. Next-generation power semiconductors aimed at high speed transmission, typically with use of SiC or GaN, are required to be durable to extremely high temperatures from 250 to 500° C., while maintaining transmission characteristic by using gold on the top and back faces of the devices.

Considering now a joint material, there has been no joint material which can satisfy advanced heat resistance required for the next-generation power semiconductors based on SiC or GaN.

For example, an SnAgCu-based joint material (powdery solder material) disclosed in JP 2007-268569 A is no more than a material which is only applicable to power semiconductors durable to as high as around 125° C., and remains inapplicable to the next-generation power semiconductors.

On the other hand, the present applicant has proposed in JP 6029222 B a metal particle that includes a shell and a core, wherein the core contains a metal or an alloy, the shell contains a mesh structure of an intermetallic compound and covers the core, the core contains Sn or Sn alloy, and the shell contains an intermetallic compound of Sn and Cu. The joint area formed of this metal particle has been proven to maintain high levels of heat resistance, joint strength and mechanical strength over a long period, even after prolonged operation at high temperatures, or after used in a harsh environment typically involving large temperature change from a high temperature operational state down to a low temperature idle state.

The intermetallic compound, however, suffers from brittleness, so that solving of this problem will open a way to provide a joint material that further excels in heat resistance, joint strength and mechanical strength.

The present applicant has further proposed in JP 6799649 B a metal particle that includes, in a basal phase that contains Sn and an Sn—Cu alloy, an intermetallic compound that contains Sn, Cu, and Ni, wherein at least parts of the Sn—Cu alloy in the basal phase and the intermetallic compound form an endotaxial joint. The basal phase that covers the intermetallic compound was, however, found to shrink in an heating environment at 260° C. or above, leading to decay of the endotaxial joint, and to promotion of void generation. The joint area would, therefore, become difficult to maintain high levels of heat resistance, joint strength, and mechanical strength over a long period, after prolonged use in a harsh environment under high temperatures.

CITATION LIST

[Patent Document 1] JP-A-2007-268569
[Patent Document 2] JP 6029222 B
[Patent Document 3] JP 6799649 B

SUMMARY OF THE INVENTION

It is therefore an object of this invention to provide a metal particle for joint material, capable of overcoming brittleness of the intermetallic compound even under drastic change of temperature ranged between extra-high temperatures and extra-low temperatures, thereby maintaining excellent joint strength and mechanical strength.

The present inventor went through extensive investigations, and found that the aforementioned decay of endotaxial joint may be suppressed, by incorporating an expansion metal (Sb, Bi or Ga), which inhibits shrinkage of the basal phase, into the basal phase. The finding led the present inventor to arrive at this invention.

That is, this invention relates to a metal particle for joint material that includes: a basal phase that contains Sn, an Sn—Cu alloy, and Sb or Bi or Ga; and, an intermetallic compound crystal that contains Sn, Cu, Ni, Ge, Si and Ti, included in the basal phase, the metal particle has a chemical composition given by 0.7 to 15% by mass of Cu, 0.1 to 5% by mass of Ni, 0.1 to 14% by mass of Sb or Bi or Ga, 0.001 to 0.1% by mass of Ge, 0.001 to 0.1% by mass of Si, 0.001 to 0.1% by mass of Ti, and the balance of Sn (possibly containing 0.1% by mass or less of an inevitable impurity);

the basal phase has a chemical composition given by 85 to 99.9% by mass of Sn, 5% by mass or less of Cu, and 0.1 to 14% by mass of Sb or Bi or Ga, the intermetallic compound crystal resides in the basal phase so as to be included therein, the metal particle has a particle size of 1 μm to 50 μm, and at least parts of the basal phase and the intermetallic compound crystal form an endotaxial joint.

Advantageous Effects of Invention

This invention can provide a metal particle for joint material, capable of overcoming brittleness of the intermetallic compound even under drastic change of temperature ranged between extra-high temperatures and extra-low temperatures, thereby maintaining excellent joint strength and mechanical strength.

BRIEF DESCRIPTION OF THE DRAWINGS

FIG. 3B contains a STEM image of the cross section of the metal particle 1 obtained in Example 1, and an image of local analysis.

FIG. 4A contains optical microscope images of a cross section of a joint structure between a gold electrode and a copper substrate obtained in Example 1, after subjected to thermal cycle test (TCT).

DESCRIPTION OF THE EMBODIMENTS

This invention will further be detailed below.

Terminology in this patent specification will be defined as follows, unless otherwise specifically noted.

(1) The term "metal" is used not only to encompass metal element as a simple substance, but also occasionally to encompass alloy and intermetallic compound composed of two or more metal elements.

(2) When referring to a certain metal element as a simple substance, it means not only an absolutely pure substance solely composed of such metal element, but also a substance containing a trace amount of other substance. That is, the metal element of course does not mean to exclude a case where a trace impurity that hardly affects properties of that metal element is contained. For example, "basal phase" does not mean to exclude a case where a part of atoms in Sn crystal is replaced by other element (Cu, for example). For example, such other substance or other element may occasionally account for 0 to 0.1% by mass of the metal particle.

(3) Endotaxial joint means that an intermetallic compound precipitates in a substance which is expected to become metal or alloy (the basal phase, in this invention), wherein the Sn—Cu alloy and the intermetallic compound join during the precipitation while attaining lattice matching, thereby producing crystal grains. "Endotaxial" is a known term, which is found for example in the last paragraph in the left column on page 160, in *Nature Chemistry*, 3(2): 160-6, 2011.

The metal particle of this invention specifically contains a basal phase that contains Sn, an Sn—Cu alloy, and Sb or Bi or Ga; and, an intermetallic compound crystal that contains Sn, Cu, Ni, Ge, Si and Ti, included in the basal phase.

Figure 1:
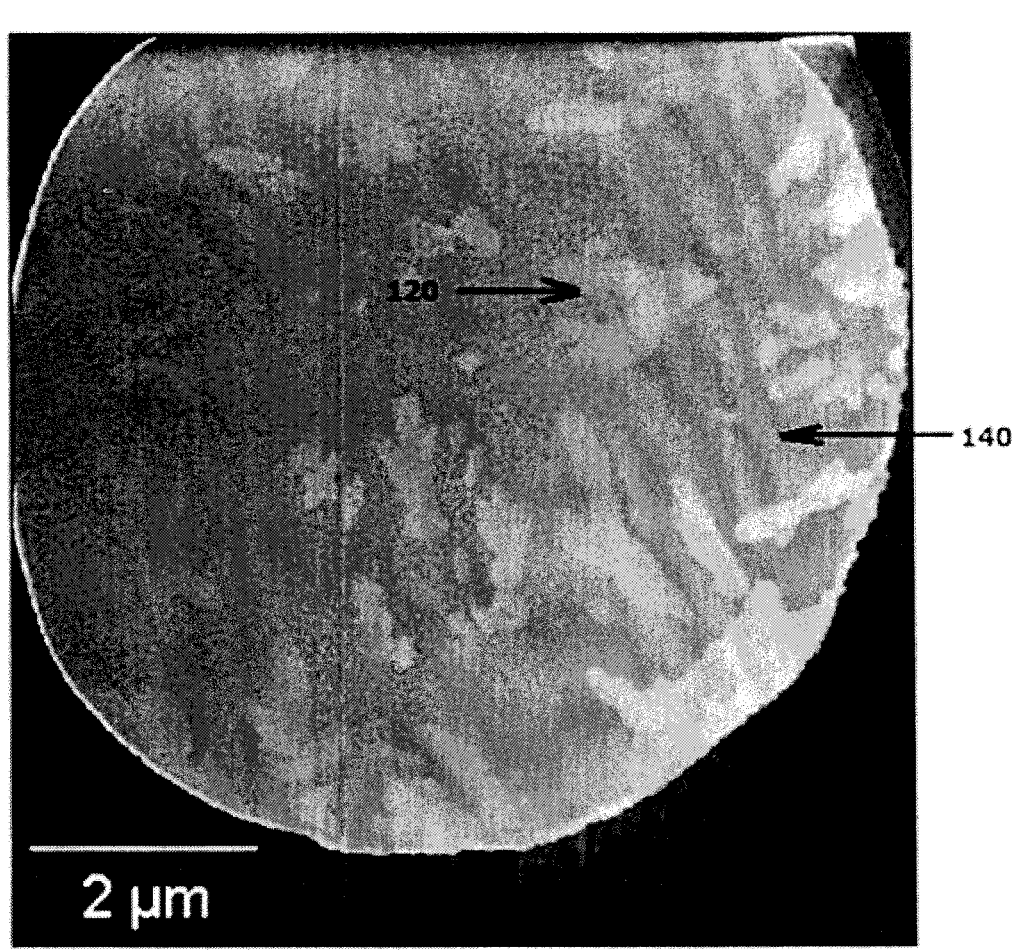
FIG. 1 is a STEM image of a cross section of a metal particle of this invention obtained in Example 1, thinned with focused ion beam (FIB).

FIG. 1 is a STEM image of a cross section of the metal particle of this invention obtained in Example 1 below, after thinned with focused ion beam (FIB). Particle size of the metal particle of this invention, which is approximately 5 μm in FIG. 1, is preferably within the range from 1 μm to 50 μm, for example. Referring now to the metal particle in FIG. 1, the metal particle has a basal phase 140 that contains Sn, an Sn—Cu alloy, and Sb; and an intermetallic compound 120 that contains Sn, Cu, Ni, Ge, Si and Ti, included in the basal phase 140.

The metal particle of this invention typically has a composition given by 0.7 to 15% by mass of Cu, 0.1 to 5% by mass of Ni, 0.1 to 14% by mass of Sb, Bi or Ga, 0.001 to 0.1% by mass or Ge, 0.001 to 0.1% by mass of Si, 0.001 to 0.1% by mass of Ti, and the balance of Sn, wherein 0.1% by mass or less of inevitable impurity may be contained.

The metal particle of this invention may be manufactured typically from a raw material having a chemical composition given by 8% by mass of Cu, 5% by mass of Sb, Bi or Ga, 0.1% by mass of Ni, 0.001% by mass of Ge, 0.001% by mass of Si, 0.001% by mass of Ti, and the balance of Sn. For example, the metal particle is obtainable by melting the raw material, feeding the molten metal onto a dish-like disk which is kept spinning at high speed in a nitrogen atmosphere, so as to centrifugally scatter the molten metal in the form of fine droplets, and by cooling and solidifying the droplets under reduced pressure.

A preferred example of a manufacturing apparatus suitable for manufacture of the metal particle of this invention will be explained referring to FIG. 2. A granulation chamber 1 has a cylindrical top and a conical bottom, and has a lid 2 placed on the top. The lid 2 has a nozzle 3 perpendicularly inserted at the center thereof, and right under the nozzle 3 arranged is a dish-like rotating disk 4. Reference sign 5 represents a mechanism that supports the dish-like rotating disk 4 so as to be movable up and down. At the lower end of the conical bottom of the granulation chamber 1, connected is a discharge pipe 6 through which the produced particles are output. The upper end of the nozzle 3 is connected to an electric furnace (high frequency induction furnace: employed in this invention is a carbon crucible, although a ceramic crucible has been used in the past) 7 in which a metal to be granulated is melted. An atmospheric gas, having a chemical composition specifically adjusted in a mixed gas tank 8, is fed through a pipe 9 and a pipe 10, respectively into the granulation chamber 1 and to the top of the electric furnace 7. The inner pressure of the granulation chamber 1 is controlled by a valve 11 and a ventilator 12, and the inner pressure of the electric furnace 7 is controlled by a valve 13 and a ventilator 14. The molten metal fed through the nozzle 3 onto the dish-like rotating disk 4 is scattered in the form of fine droplets with the aid of centrifugal force of the dish-like rotating disk 4, and then solidified after cooled under reduced pressure. The thus produced solid particles are fed through the discharge pipe 6 to an automatic filter 15, where the particles are classified. Reference sign 16 represents a particle collector.

A process of bringing the molten metal from the hot molten state down to the cold solidified state is the key for formation of the metal particle of this invention.

The process is carried out under conditions exemplified below.

With the melting temperature of metal in the electric furnace 7 preset to 600° C. to 800° C., the molten metal kept at that temperature is fed through the nozzle 3 onto the dish-like rotating disk 4.

The dish-like rotating disk 4 is a dish-like disk having an inner diameter of 35 mm and a thickness of rotating plate of 5 mm, which is rotated at 80,000 to 100,000 rpm.

A vacuum chamber which can be evacuated down to $9 \times 10^{-2}$ Pa or around is employed here as the granulation chamber 1, and is evacuated, to which nitrogen gas conditioned at 15 to 50° C. is fed while concurrently ventilating the chamber, so as to adjust the pressure in the granulation chamber 1 to $1 \times 10^{-1}$ Pa or below.

Chemical composition of the basal phase in the metal particle of this invention is preferably given by 85 to 99.9% by mass of Sn, 5% by mass or below (0.3 to 5% by mass, for example) of Cu, 0.1 to 14% by mass of Sb, Bi or Ga, and 0.1% by mass or below of inevitable impurity.

Chemical composition of the intermetallic compound crystal, inclusive of an endotaxial joint area, is preferably given by:

50 to 70% by mass of Sn;

30 to 50% by mass of Cu;

0 to 3% by mass of Sb;

0.1 to 6.5% by mass of Ni;

0.001 to 0.1% by mass of Ge;

0.001 to 0.1% by mass of Si; and 0.001 to 0.1% by mass of Ti.

The intermetallic compound in the metal particle of this invention typically accounts for 20 to 60% by mass of the whole metal particle, wherein the percentage is more preferably 30 to 40% by mass.

The intermetallic compound crystal residing in the basal phase so as to be included therein.

The chemical compositions and the percentages of the basal phase and the intermetallic compound may be satisfied by following the aforementioned conditions for manufacturing the metal particle.

The metal particle of this invention is preferably structured in which at least parts of the basal phase and the intermetallic compound form the endotaxial joint. As described previously, the endotaxial joint means that an intermetallic compound precipitates in a substance which is expected to become metal or alloy (the basal phase, in this invention), wherein the Sn—Cu alloy and the intermetallic compound join during the precipitation while attaining lattice matching, thereby producing crystal grains. Formation of the endotaxial joint can solve the problem of brittleness of the intermetallic compound, can also suppress the mechanical strength from degrading due to changes in the crystal structure of Sn described later, and can also provide a joint material that further excels in heat resistance, joint strength and mechanical strength. The present inventor has confirmed that the joint area, formed by using the metal particle of this invention, can maintain the endotaxial joint in the metal particle.

The endotaxial joint in the metal particle of this invention may be formed according to conditions for cooling and solidifying the molten metal from a molten state at high temperatures, in the process of forming the metal particle of this invention.

In the metal particle of this invention, area ratio of the endotaxial joint, when assuming the total area of joint faces between the Sn—Cu alloy in the basal phase and the intermetallic compound as 100%, is preferably 30% or larger, and more preferably 60% or larger. The area ratio of the endotaxial joint may be calculated typically as follows.

A cross section of the metal particle, such as presented in FIG. 1, is photographed under an electron microscope, and the joint faces between the intermetallic compound and the Sn—Cu alloy are sampled at 50 freely selected points. The joint faces are then examined by image analysis, thereby determining to what degree the endotaxial joint, such as described later in EXAMPLES, resides in the sampled joint faces.

Sn has a tetragonal crystal structure within a temperature range from approximately 13° C. to approximately 160° C. (Sn with the tetragonal crystal structure will be referred to as β-Sn), which causes transition to a cubic crystal structure in a lower temperature region (Sn with the cubic crystal structure will be referred to as α-Sn). The β-Sn crystal structure also causes transition to a high temperature phase crystal called orthorhombic crystal structure in a temperature region above approximately 160° C. (Sn with the orthorhombic crystal structure will be referred to as γ-Sn). The phase transition between the tetragonal β-Sn and the cubic α-Sn has been known to be accompanied by a particularly large volumetric change.

The metal particle of this invention contains a high temperature phase crystal even at approximately 160° C. or below (at room temperature, for example). For example, if the joint material that contains the metal particle is heated during the joining process, so as to keep the joint material in a semi-molten state rather than in full molten state, in which the endotaxial joint formed between the intermetallic compound and the basal phase can exist, the joint structure will maintain a structure that contains the high temperature phase crystal even after cooled down to a temperature range of 160° C. or below. Such high temperature phase crystal is less likely to cause phase transition to the tetragonal low temperature β-Sn phase, even if the temperature is lowered down to a certain degree. Sn thus remained not transitioned to the tetragonal β-Sn will not cause phase transition to α-Sn, and therefore will not cause a large volumetric change in association with the phase transition to α-Sn under decreasing temperature. Hence, the joint material, in which Sn maintains the high temperature phase crystal even in a temperature range of 160° C. or below (at room temperature, for example), is relieved from a large volumetric change due to temperature change, as compared with any other joint material that contains Sn in its chemical composition (that is, any joint material to which the high temperature phase crystal, which can reside even in a temperature range of 160° C. or below, is not intentionally included).

Electronic components employ various metals including Cu, Ag, Au, Ni and so forth, with which Sn can join in a reliable manner.

With the high temperature phase crystal maintained therein over a wide temperature range (even at room temperature, for example), and is thus suppressed as possible from producing therein the low temperature β-Sn phase, the metal particle of this invention is now featured by its unlikeliness of causing a large volumetric change in association with phase transition from tetragonal β-Sn to cubic α-Sn under temperature change, and can therefore join with various metals employed in electronic components. Hence, the metal particle is especially beneficial for joining of fine joint part.

The effect obtainable by suppressing changes in crystal structure of Sn may properly be demonstrated by the endotaxial joint in the metal particle.

The metal particle of this invention may be formed into a sheet or a paste, which is kept in contact with an object to be joined at 160° C. to 180° C. for 3 minutes or longer, allowed to melt at 235° C. to 265° C., and then solidified. Good joint is thus be formed.

The sheet that contains, as a material, the metal particle of this invention is obtainable typically by compressing the metal particle between rollers, typically as described below. That is, the metal particle of this invention is fed between a pair of pressure rollers that rotate in opposing directions, and then compressed while being heated through the pressure rollers to approximately 100° C. to 150° C.

Furthermore, the metal particle of this invention (IMC particle), when combined for example with Cu particle, Ni alloy particle or hydrogenated Ti powder which is more conductive than Sn, will have improved electro-conductivity and will be suppressed from causing volumetric change over a relatively wide temperature range, making it possible to manufacture a composite joint material sheet combined with ceramic or the like, and also to obtain a base which functions as a heat-dissipation joint material.

The metal particle of this invention may also yield a conductive paste, by dispersing it in an organic vehicle.

The sheet or the conductive paste may be formed of a mixture of the metal particle, obtainable by adding other particle such as SnAgCu-based alloy particle, Cu particle, Cu alloy particle, Ni particle, Ni alloy particle, or mixture of any of these particles. Such other particle may optionally be coated with a metal such as Si.

For example, by combining the metal particle with Cu particle or Ni alloy particle which is more conductive than Sn, obtainable is a metal joint layer which is highly conductive, and is well suppressed from causing the volumetric change over a relatively wide temperature range.

The joint structure of this invention may be formed with use of the metal particle of this invention.

Figure 8:
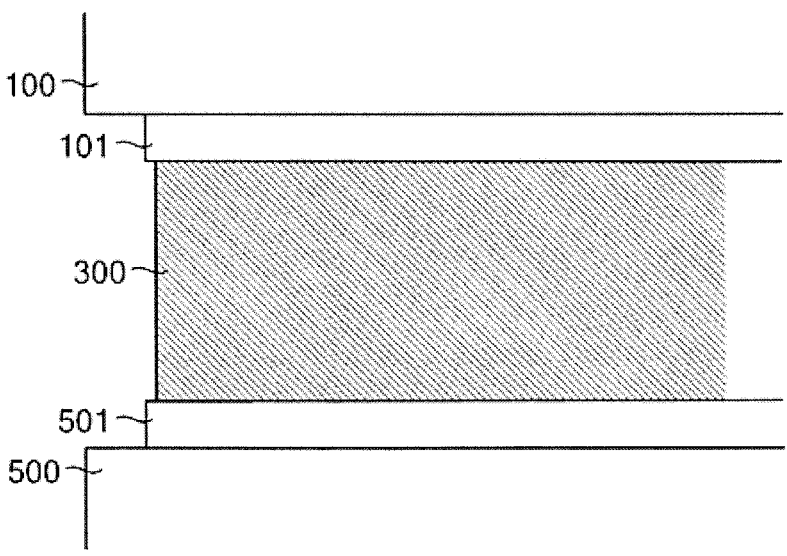
FIG. 8 is a schematic cross-sectional view illustrating the joint structure in this invention.

FIG. 8 is a schematic cross-sectional view illustrating a structure of the joint structure of this invention.

Referring now to FIG. 8, a joint structure 300 joins metal/alloy bodies 101, 501 (Cu electrodes in FIG. 8), respectively formed on substrates 100, 500 which are oppositely arranged. The joint structure 300 specifically has the aforementioned chemical composition, in which at least parts of the basal phase and the intermetallic compound form the endotaxial joint, and the basal phase comes into contact with the metal/alloy bodies 101, 501.

Each of the substrates 100, 500 has arranged thereon a semiconductor device, thereby typically constituting an electronic/electric device such as power device. Each of the metal/alloy bodies 101, 501 is a connecting member such as electrode, bump, terminal, or lead conductor, which is integrally provided to each of the substrates 100, 500. The metal/alloy bodies 101, 501 in the electronic/electric device such as power device are usually formed of Cu or an alloy thereof. This, however, does not preclude that any part equivalent to the substrates 100, 500 is formed of the metal/alloy bodies.

The joint structure of this invention may be formed with use of the metal particle of this invention. The present inventor has confirmed that the joint structure of this invention, obtainable with use of the metal particle after heating, has a crystal structure same as that of the metal particle (note that the joint structure will additionally contain Cu, in a case where the metal/alloy bodies 101, 501 contain Cu).

The joint structure of this invention specifically has a basal phase that contains Sn, an Sn—Cu alloy, and Sb or Bi or Ga; and, an intermetallic compound crystal that contains Sn, Cu, Ni, Ge, Si and Ti, and an endotaxial joint area, both included in the basal phase, the joint structure has a composition given by 8 to 45% by mass of Cu, 0.1 to 5% by mass of Ni, 0.1 to 14% by mass of Sb or Bi or Ga, 0.001 to 0.1% by mass of Ge, 0.001 to 0.1% by mass of Si, 0.001 to 0.1% by mass of Ti, and the balance of Sn (possibly containing 0.1% by mass or less of an inevitable impurity), the basal phase has a composition given by 85 to 99.9% by mass of Sn, 5% by mass or less of Cu, and 0.1 to 14% by mass of Sb or Bi or Ga, the intermetallic compound crystal resides in the basal phase so as to be included therein, and at least parts of the basal phase and the intermetallic compound crystal form an endotaxial joint.

Chemical composition of the intermetallic compound crystal in the joint structure of this invention is preferably given by:

50 to 70% by mass of Sn;

30 to 50% by mass of Cu;

0 to 3% by mass of Sb;

0.1 to 6.5% by mass of Ni;

0.001 to 0.1% by mass of Ge;

0.001 to 0.1% by mass of Si; and 0.001 to 0.1% by mass of Ti.

The intermetallic compound in the joint structure of this invention typically accounts for 20 to 60% by mass of the joint structure, wherein the percentage is more preferably 30 to 40% by mass.

In the joint structure of this invention, at least parts of the Sn—Cu alloy in the basal phase, and the intermetallic compound preferably form the endotaxial joint. Area ratio of the endotaxial joint, when assuming the total area of joint face between the Sn—Cu alloy in the basal phase and the intermetallic compound as 100%, is preferably 30% or larger, and more preferably 60% or larger.

Another preferred embodiment of the joint structure of this invention is preferably structured to have the Sn—Cu alloy and/or the intermetallic compound that form an epitaxial joint with the metal/alloy bodies 101, 501.

EXAMPLES

This invention will further be explained below referring to Examples and Comparative Example. This invention is, however, not limited to Examples below.

Example 1

Figure 2:
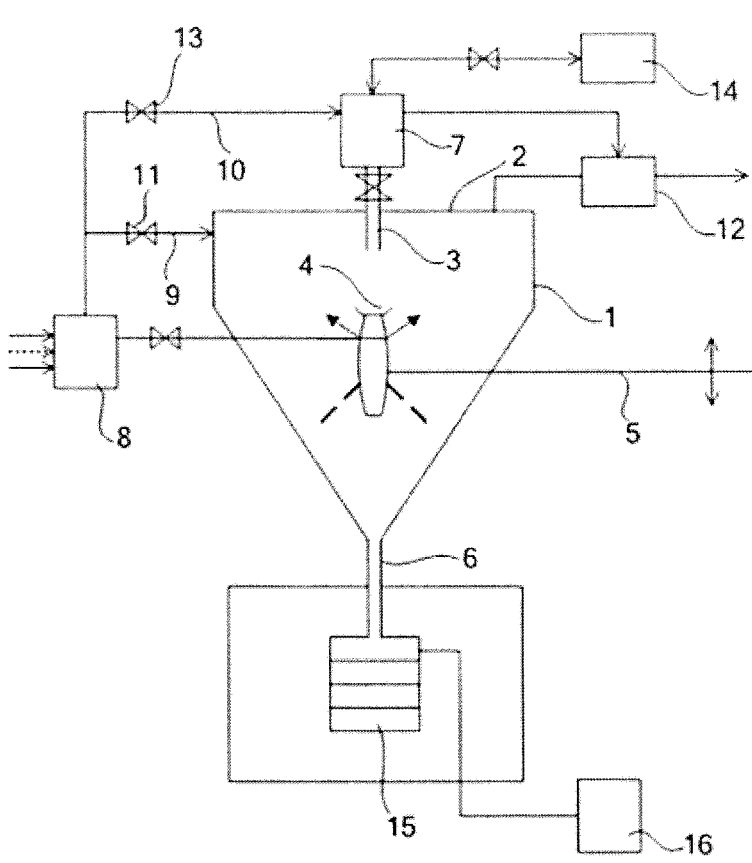
FIG. 2 is a drawing illustrating an exemplary manufacturing apparatus suitably applicable to manufacture of the metal particle of this invention.

A metal particle 1 having a diameter of approximately 3 to 13 μm was manufactured from a raw material composed of 8% by mass of Cu, 5% by mass of Sb, 0.1% by mass of Ni, 0.001% by mass of Ge, 0.001% by mass of Si, and 0.001% by mass of Ti, and the balance of Sn, with use of the manufacturing apparatus illustrated in FIG. 2.

Conditions below were employed for the process.

A melting crucible was placed in the electric furnace 7, into which the aforementioned raw material was placed and melted at 650° C., and while keeping the temperature, the molten metal was fed through the nozzle 3 onto the dish-like rotating disk 4.

The dish-like rotating disk 4 employed here was a dish-like disk with an inner diameter of 35 mm and a thickness of rotating plate of 5 to 3 mm, which was rotated at 80,000 to 100,000 rpm.

The granulation chamber 1 employed here was a vacuum chamber allowed for evacuation down to around $9 \times 10^{-2}$ Pa, and was evacuated to an inner pressure of $1 \times 10^{-1}$ Pa or below, while feeding therein nitrogen gas at 15 to 50° C., and concurrently evacuating the chamber.

Figure 3A:
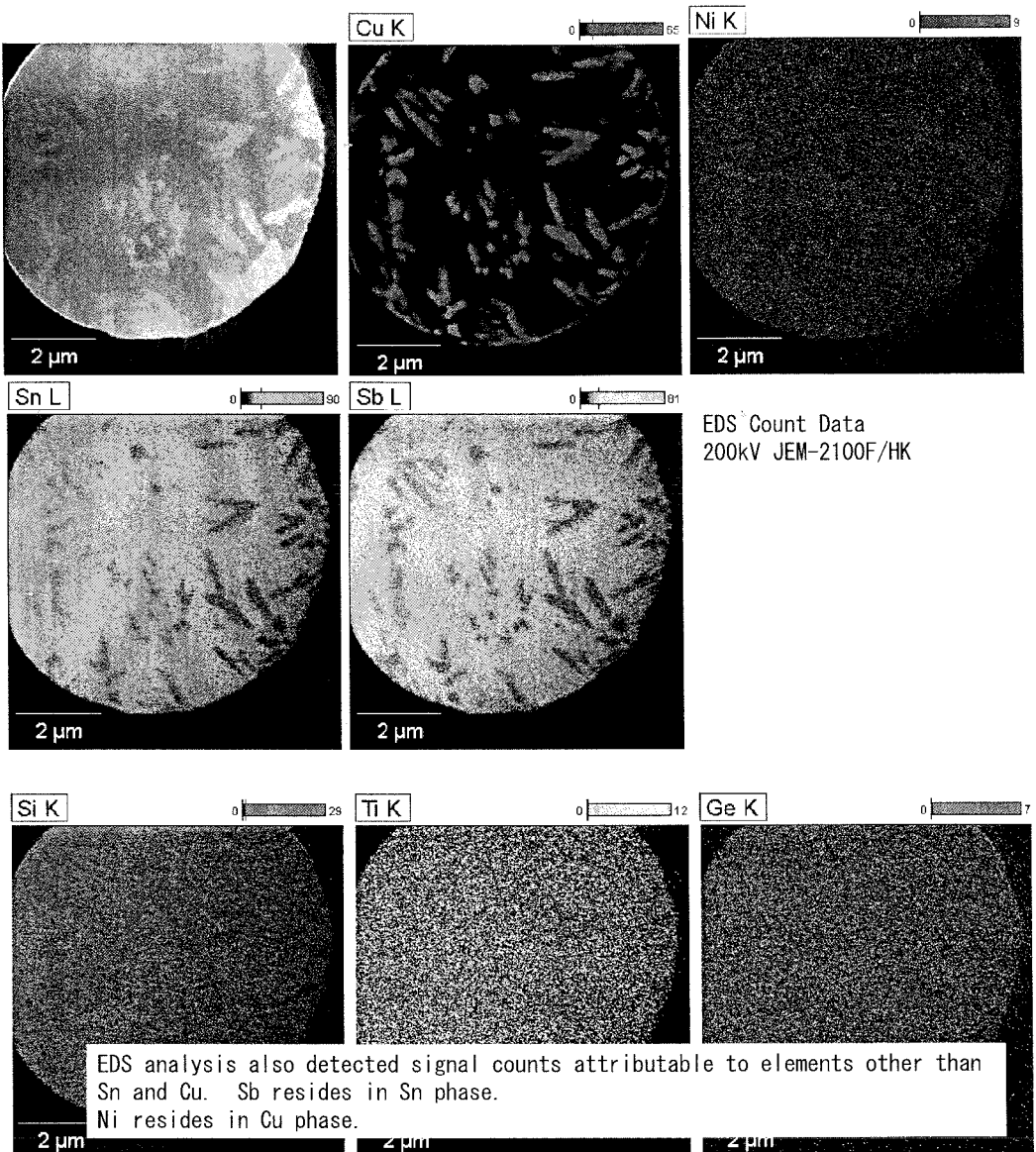
FIG. 3A contains elemental maps of a cross section of a metal particle 1 obtained in Example 1, analyzed by EDS.

The obtained metal particle 1 was found to have a cross section presented in FIG. 1. EDS element mapping on a cross section of the metal particle 1 revealed that the composition of the metal particle is given by 7.32% by mass of Cu, 4.35% by mass of Sb, 0.13% by mass of Ni, 0.001% by mass of Ge, 0.001% by mass of Si, 0.001% by mass of Ti, and the balance of Sn (see FIG. 3A).

The intermetallic compound crystal, inclusive of an endotaxial joint area, was found to have a chemical composition given by:

50 to 65% by mass of Sn;
  30 to 45% by mass of Cu;
  1 to 2.5% by mass of Sb;
  0.3 to 0.5% by mass of Ni;
  0.001% by mass of Ge;
  0.001% by mass of Si; and
  0.001% by mass of Ti.

The intermetallic compound in the metal particle 1 was found to account for 30 to 35% by mass of the metal particle.

FIG. 3B contains a STEM image of a cross section of the metal particle 1 obtained in Example 1, and an image of local analysis.

The lower left part of FIG. 3B teaches that an intermetallic compound 120 that contains Sn, Cu, Ni, Ge, Si and Ti resides, so as to be included, in the basal phase 140 that contains Sn, Sn—Cu alloy, and Sb. An enlarged view on the right part of FIG. 3B teaches that lattice constants (and crystal orientations) match between the Sn—Cu alloy in the basal phase 140 and the intermetallic compound 120, proving that the individual crystals continuously join while attaining lattice matching. That is, the endotaxial joint was confirmed from the enlarged view on the right part of FIG. 3B that indicates establishment of lattice matching, and also absence of a buffer layer between the crystals was confirmed from the upper left part of FIG. 3B that presents a transmission electron diffraction pattern of the interface between the basal phase 140 and the intermetallic compound 120.

It was also found from FIG. 3B that at least a part of Sn in the metal particle 1 of this Example maintains the high temperature phase crystal even at normal temperature.

Next, the metal particle 1 in a dry powder form was compressed to manufacture a sheet, the sheet was then used for joining a gold electrode and a copper substrate to form the joint structure, and subjected to a high temperature storage test (HTS) at 260° C. Results indicated that shear strength elevated from approximately 50 MPa up to approximately 60 MPa, over a period ranging from the start of test until approximately 100 hours after, and stabilized at approximately 60 MPa over a temporal range beyond 100 hours.

On the other hand, temperature cycle test (TCT) over a range from −40 to 200° C. yielded results indicating that the shear strength was stabilized at approximately 50 MPa over the whole cycles (1000 cycles).

Results are illustrated in FIG. 4A. The lower tier of FIG. 4A contains partial enlarged views of the view on the upper tier of FIG. 4A. Results of FIG. 4A teach that the joint structure produced in Example 1 has no cracks or the like observed therein, proving that the joint structure is capable of overcoming brittleness of the intermetallic compound even under drastic change of temperature, thereby maintaining excellent joint strength and mechanical strength.

Figure 4B:
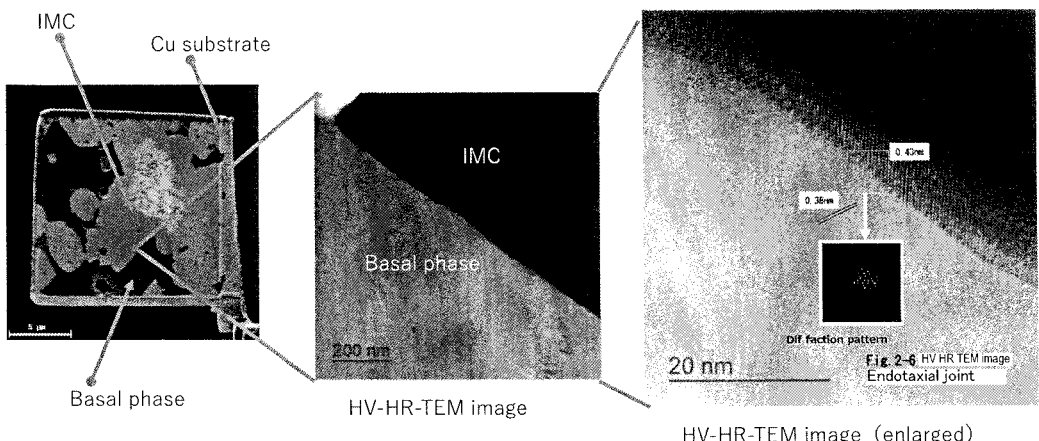
FIG. 4B contains a STEM image of the cross section of the joint structure obtained in Example 1, and images of local analysis.

FIG. 4B contains a STEM image of the cross section of the joint structure produced in Example 1, and results of local analysis. The left image of FIG. 4B is a STEM image of the cross section of the joint structure produced in Example 1, the middle image is an enlarged photograph thereof, and the right image is a further enlarged photograph thereof. From the right image of FIG. 4B, the Sn—Cu alloy in the basal phase 140 and the intermetallic compound 120 were confirmed to continuously join while establishing lattice matching between the individual crystals. That is, the endotaxial joint was confirmed from the right image of FIG. 4B that indicates establishment of lattice matching, and also absence of a buffer layer between the crystals was confirmed from a transmission electron diffraction pattern, embedded in the right image of FIG. 4B, which presents a transmission electron diffraction pattern of the interface between the basal phase 140 and the intermetallic compound 120.

Example 2

A metal particle 2 was manufactured in the same way as in Example 1, except for use of a raw material composed of 15% by mass of Cu, 4.26% by mass of Sb, 0.22% by mass of Ni, 0.001% by mass of Ge, 0.001% by mass of Si, 0.001% by mass of Ti, and the balance of Sn.

Also the metal particle 2 was confirmed to contain the endotaxial joint formed between the Sn—Cu alloy in the basal phase and the intermetallic compound.

Next, 70 parts by mass of the metal particle 2, and 30 parts by mass of alloy powder composed of 90% by mass of Cu and 10% by mass of Ni were homogeneously mixed, and the mixture in a dry powder form was compressed to manufacture a sheet (50 μm thick). The sheet was then used for joining the copper substrate and the silicon device, and subjected to the high temperature storage test (HTS) at 260° C. Results indicated that shear strength elevated from approximately 60 MPa up to approximately 70 MPa, over a period ranging from the start of test until approximately 100 hours after, and stabilized at approximately 60 MPa over a temporal range beyond 100 hours.

On the other hand, temperature cycle test (TCT) over a range from −40 to 200° C. yielded results indicating that the shear strength was stabilized at approximately 50 MPa over the whole cycles (1000 cycles).

Figure 5:
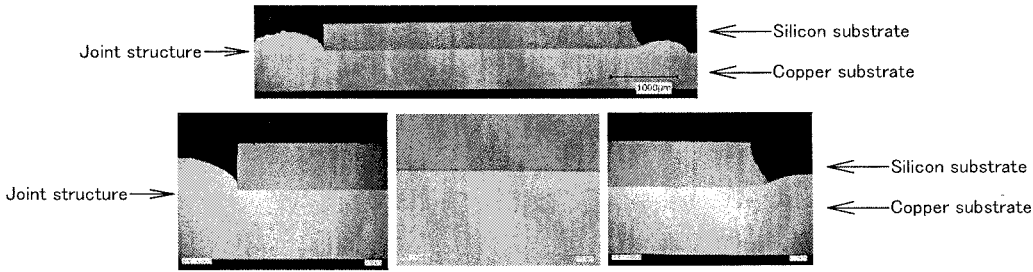
FIG. 5 contains optical microscope images of a cross section of a joint structure between a gold electrode and a silicon substrate obtained in Example 2, after subjected to thermal cycle test (TCT).

Results are illustrated in FIG. 5. The lower tier of FIG. 5 contains partial enlarged views of the view on the upper tier of FIG. 5. Results of FIG. 5 teach that the joint structure produced in Example 2 has no cracks or the like observed therein, proving that the joint structure is capable of overcoming brittleness of the intermetallic compound even under drastic change of temperature, thereby maintaining excellent joint strength and mechanical strength.

Example 3

A metal particle 3 was manufactured in the same way as in Example 1, except for use of a raw material composed of 8% by mass of Cu, 0.3% by mass of Sb, 0.9% by mass of Ni, 0.001% by mass of Ge, 0.001% by mass of Si, 0.001% by mass of Ti, and the balance of Sn.

Figure 6A:
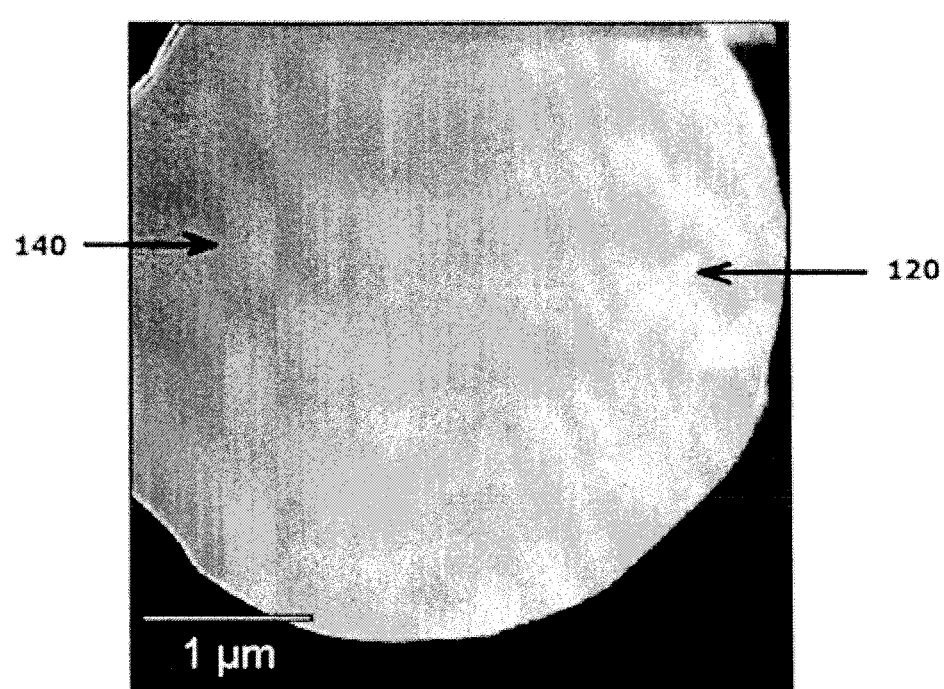
FIG. 6A is a STEM image of a cross section of a metal particle 3 obtained in Example 3, after thinned with focused ion beam (FIB).
Figure 6B:
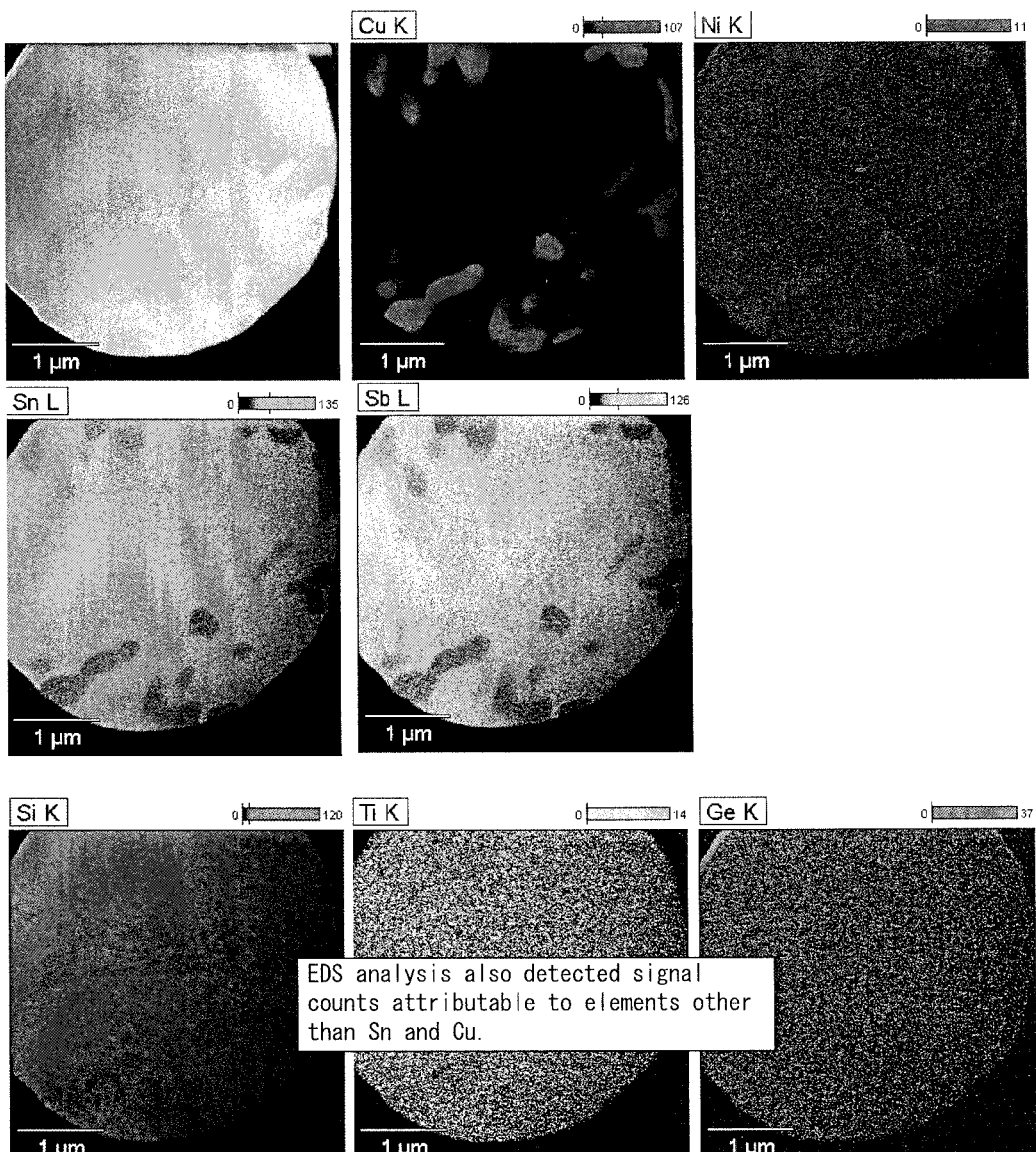
FIG. 6B contains elemental maps of a cross section of the metal particle 3 obtained in Example 3, analyzed by EDS.

The obtained metal particle 3 was found to have a cross section illustrated in FIG. 6A. EDS elemental mapping of the metal particle 3 (see FIG. 6B) revealed that the chemical composition of the metal particle is given by 8.26% by mass of Cu, 1.0% by mass of Sb, 0.09% by mass of Ni, 0.001% by mass of Ge, 0.001% by mass of Si, 0.001% by mass of Ti, and the balance of Sn. Also the metal particle 3 was found to have the endotaxial joint between the Sn—Cu alloy in the basal phase and the intermetallic compound, similarly to that illustrated in FIG. 3B.

The chemical composition of the intermetallic compound crystal, inclusive of the endotaxial joint area, was found to be given by:

50 to 65% by mass of Sn;
  30 to 45% by mass of Cu;
  0.1 to 0.5% by mass of Sb;

0.3 to 0.5% by mass of Ni;

0.001% by mass of Ge;

0.001% by mass of Si; and 0.001% by mass of Ti.

Next, 70 parts by mass of the metal particle 3, and 30 parts by mass of alloy powder composed of 90% by mass of Cu and 10% by mass of Ni were homogeneously mixed, and the mixture in a dry powder form was compressed to manufacture a sheet (50 μm thick). The sheet was then used for joining the copper substrate and the silicon device, and subjected to the high temperature storage test (HTS) at 260° C. Results indicated that shear strength elevated from approximately 60 MPa up to approximately 70 MPa, over a period ranging from the start of test until approximately 100 hours after, and stabilized at approximately 60 MPa over a temporal range beyond 100 hours.

On the other hand, temperature cycle test (TCT) over a range from −40 to 200° C. yielded results indicating that the shear strength was stabilized at approximately 50 MPa over the whole cycles (1000 cycles).

Comparative Example

In Comparative Example, a joint structure was formed by similarly repeating the process in Example 1, except for using a raw material composed of 8% by mass of Cu, 0% by mass of Sb, 0.1% by mass of Ni, 0.001% by mass of Ge, 0.001% by mass of Si, 0.001% by mass of Ti, and the balance of Sn, subjected to the temperature cycle test (TCT) over a range from −40 to 200° C., and a cross section of the joint structure between the gold electrode and the copper substrate was observed under an optical microscope.

Figure 7:
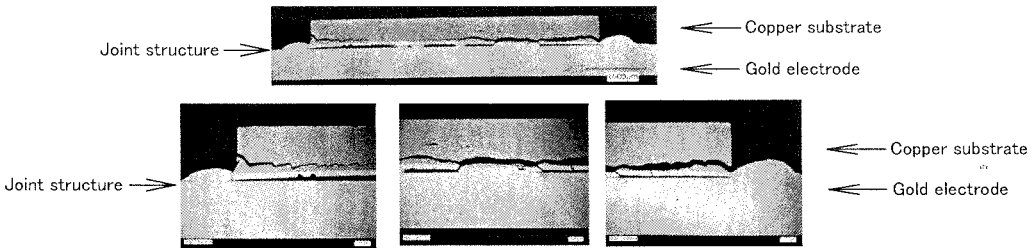
FIG. 7 contains optical microscope images of a cross section of a joint structure between a gold electrode and a copper substrate obtained in Comparative Example 1, after subjected to thermal cycle test (TCT).

Results are illustrated in FIG. 7. The lower tier of FIG. 7 contains partial enlarged views of the view on the upper tier of FIG. 7. Results of FIG. 7 teach that the joint structure produced in Comparative Example has cracks produced therein, proving that the joint structure was incapable of maintaining proper strength and mechanical strength, under drastic change of temperature.

Having detailed this invention referring to the attached drawings, this invention is not limited to these Examples. It is apparent that those skilled in the art will easily arrive at various modifications, on the basis of basic technical spirit and teaching of this invention.

REFERENCE SIGNS LIST

1 granulation chamber

2 lid

3 nozzle

4 dish-like rotating disk

5 rotating disk support mechanism

6 particle discharge pipe

7 electric furnace

8 mixed gas tank

9 pipe

10 pipe

11 valve

12 ventilator

13 valve

14 ventilator

15 automatic filter

16 particle collector

100 substrate

101 metal/alloy body

300 joint structure

500 substrate

12

501 metal/alloy body

120 intermetallic compound

140 basal phase

What is claimed is:

1. A metal particle for joint material, wherein the metal particle forms a joint structure that joins a metallic body or an alloy body;

the metal particle for joint material consisting essentially of:

a basal phase that contains:

Sn;

an Sn—Cu alloy; and

Sb or Bi or Ga, and an intermetallic compound crystal that contains Sn, Cu, Ni, Ge, Si and Ti, included in the basal phase, the metal particle having a chemical composition given by 0.7 to 15% by mass of Cu, 0.1 to 5% by mass of Ni, 0.1 to 4.35% by mass of Sb or Bi or Ga, 0.001 to 0.1% by mass of Ge, 0.001 to 0.1% by mass of Si, 0.001 to 0.1% by mass of Ti, 0.1% by mass or less of an inevitable impurity, and the balance of Sn, the basal phase having a chemical composition given by 85 to 99.9% by mass of Sn, 5% by mass or less of Cu, and 0.1 to 14% by mass of Sb or Bi or Ga, the intermetallic compound crystal residing in the basal phase so as to be included therein, the metal particle having a particle size of 1 μm to 50 μm, and at least parts of the basal phase and the intermetallic compound crystal forming an endotaxial joint;

wherein the intermetallic compound crystal, inclusive of an endotaxial joint area, has a chemical composition given by:

50 to 70% by mass of Sn;

30 to 50% by mass of Cu;

0 to 3% by mass of Sb;

0.1 to 6.5% by mass of Ni;

0.001 to 0.1% by mass of Ge;

0.001 to 0.1% by mass of Si; and 0.001 to 0.1% by mass of Ti, wherein at least one of the Sn—Cu alloy of the basal phase, and the intermetallic compound forms an epitaxial joint with a connecting member, wherein the Sb or Bi or Ga contained in the basal phase inhibits shrinkage of the basal phase, and wherein the intermetallic compound crystal in the metal particle accounts for 20 to 60% by mass of the whole metal particle.

2. A joint structure that joins a metallic body or an alloy body, the joint structure consisting essentially of:

a basal phase that contains:

Sn;

an Sn—Cu alloy; and

Sb or Bi or Ga, and an intermetallic compound crystal that contains Sn, Cu, Ni, Ge, Si and Ti, and an endotaxial joint area, both included in the basal phase, the joint structure having a composition given by 8 to 45% by mass of Cu, 0.1 to 5% by mass of Ni, 0.1 to 4.35% by mass of Sb or Bi or Ga, 0.001 to 0.1% by mass of Ge, 0.001 to 0.1% by mass of Si, 0.001 to 0.1% by mass of Ti, 0.1% by mass or less of an inevitable impurity, and the balance of Sn, the basal phase having a composition given by 85 to 99.9% by mass of Sn, 5% by mass or less of Cu, and 0.1 to 14% by mass of Sb or Bi or Ga, the intermetallic compound crystal residing in the basal phase so as to be included therein, and at least parts of the basal phase and the intermetallic compound crystal forming an endotaxial joint;

wherein the intermetallic compound crystal, inclusive of the endotaxial joint area, has a chemical composition given by:

50 to 70% by mass of Sn;

30 to 50% by mass of Cu;

0 to 3% by mass of Sb;

0.1 to 6.5% by mass of Ni;

0.001 to 0.1% by mass of Ge;

0.001 to 0.1% by mass of Si; and 0.001 to 0.1% by mass of Ti, wherein at least one of the Sn—Cu alloy of the basal phase, and the intermetallic compound forms an epitaxial joint with a connecting member, wherein the Sb or Bi or Ga contained in the basal phase inhibits shrinkage of the basal phase, and wherein the intermetallic compound crystal in the joint structure accounts for 20 to 60% by mass of the joint structure.

* * * * *